US005673816A

United States Patent [19]

Larson et al.

[11] Patent Number: 5,673,816

[45] Date of Patent: Oct. 7, 1997

[54] ROOFING WASHER MAGAZINE FOR BARBED ROOFING WASHERS

[75] Inventors: Paul M. Larson, Palatine; William J. Blucher, Addison; Sigismund G. Paul, Park Ridge, all of Ill.

[73] Assignee: Illinois Tool Works Inc., Glenview, Ill.

[21] Appl. No.: 416,298

[22] Filed: Apr. 4, 1995

[51] Int. Cl.$^6$ .......... B65G 59/00

[52] U.S. Cl. .......... 221/273; 221/276; 221/199; 221/224; 221/197

[58] Field of Search .......... 221/273, 197, 221/198, 199, 224, 186, 187, 276, 53, 310

[56] References Cited

U.S. PATENT DOCUMENTS

| | | | |
|---|---|---|---|
| 3,186,593 | 6/1965 | Miotke | 221/199 X |
| 3,228,555 | 1/1966 | Pinto | 221/199 |
| 4,817,818 | 4/1989 | Lockhart | 221/197 X |
| 4,890,968 | 1/1990 | Beach et al. | 411/531 |
| 5,042,142 | 8/1991 | Beach et al. | 29/787 |
| 5,056,684 | 10/1991 | Beach et al. | 221/197 |
| 5,207,351 | 5/1993 | Lesar | 221/224 X |
| 5,335,826 | 8/1994 | Kazino | 221/276 X |
| 5,347,707 | 9/1994 | Beach | 29/809 |

*Primary Examiner*—William E. Terrell
*Assistant Examiner*—Khoi Tran
*Attorney, Agent, or Firm*—Dressler, Rockey, Milnamow & Katz, Ltd.

[57] ABSTRACT

In a washer-dispensing machine, a chute open at a lower end receives a stack of roofing washers of a type having a central aperture to receive a fastener shank and possibly having downwardly extending barbs. A shuttle engages a single washer from the stack, displaces the single washer to a separated position as the shuttle is moved from a displaced position to a normal position, and releases the single washer in the separated position as the shuttle next moves from the normal position to the displaced position. A known mechanism is employed for moving the shuttle between the displaced position and the normal position. A novel mechanism is mounted operatively to the chute for supporting the stack so as to prevent any of the washers in the stack from dropping through the lower end of the chute and for releasing the stack so as to permit a lowermost washer in the stack to drop through the lower end of the chute. A preferred embodiment includes two stack-supporting fingers and two finger-moving plates, each finger-moving plate coacting with one of the stack-supporting fingers and coacting with a shuttle-moving mechanism so as to support and release the stack appropriately as the machine is operated. An alternative embodiment includes two pivotably mounted, stack-supporting fingers coacting with a shuttle-moving mechanism so as to function similarly.

9 Claims, 6 Drawing Sheets

ROOFING WASHER MAGAZINE FOR BARBED ROOFING WASHERS

TECHNICAL FIELD OF THE INVENTION

This invention pertains to an improved magazine for a stack of roofing washers of a type having a central aperture to receive a fastener shank and having downwardly extending barbs. The improved magazine is employed in a washer-dispensing machine of a type exemplified in Beach et al. U.S. Pat. No. 5,056,684.

Background of the Invention

In a washer-dispensing machine of the type noted above, a chute open at a lower end receives a stack of roofing washers of a type having a central aperture to receive a fastener shank. Moreover, a shuttle is operative to engage a single washer from the stack, to displace the single washer to a separated position as the shuttle is moved from a displaced position to a normal position, and to release the single washer in the separated position as the shuttle next moves from the normal position to the displaced position.

As illustrated and described in Beach et al. U.S. Pat. No. 5,056,694, the washer-dispensing machine comprises shuttle-moving means arranged to be operator-actuated for moving the shuttle forcibly from the normal position to the displaced position when actuated and for moving the shuttle from the displaced position to the normal position when deactuated.

As illustrated and described therein, the washer-dispensing machine may be a washer-dispensing and fastener-driving machine of a type exemplified in Beach et U.S. Pat. No. 4,890,968 and No. 5,056,684. As illustrated and described in Beach et U.S. Pat. Nos. 4,890,968 and No. 5,056,684, a washer-dispensing and fastener-driving machine is used to fasten a sheet of roofing material, such as a blanket of roofing insulation, to an underlayment, such as a wooden roof, by screws having heads and integral washers with a roofing washer between the head of each screw and the sheet of roofing material.

The washer-dispensing and fastener-driving machine illustrated and described in Beach et U.S. Pat. Nos. 4,890,968 and No. 5,056,684 employs roofing washers of a type made from a steel blank, which is embossed so as to be nestable with like overlying and underlying washers in a stack, and which has a substantially square shape with rounded corners. The washer-dispensing machine illustrated and described in Beach et al. U.S. Pat. No. 5,056,684, the washer-dispensing machine employs either such substantially square washers or generally circular, embossed steel washers having polymeric inserts.

However, it has proved to be very difficult to employ in such a washer-dispensing and fastener-driving machine, or in such a washer-dispensing machine, generally circular, embossed steel washers having polymeric inserts if the washers have downwardly extending barbs. Since such barbs tend to catch on the shuttle, when the shuttle is being moved so as to move such a washer from the stack, an overlying washer may catch on the shuttle whereby the machine may jam.

SUMMARY OF THE INVENTION

This invention provides an improved magazine for a stack of roofing washers of a type having a central aperture to receive a fastener shank and possibly having downwardly extending barbs. The improved magazine comprises a chute adapted to contain the stack of roofing washers, the chute having a lower end, which is open. The improved magazine further comprises means mounted operatively to the chute and operative selectively for supporting the stack so as to prevent any of the washers in the stack from dropping through the lower end of the chute and for releasing the stack so as to permit a lowermost washer in the stack to drop through the lower end of the chute.

In one contemplated arrangement, the supporting and releasing means includes a stack-supporting finger mounted operatively to the chute so that a distal part of the stack-supporting finger is movable between a stack-supporting position and an stack-releasing position, so that the distal part extends beneath and engages the second to lowermost washer in the stack, through an aperture in the chute, when the distal part is moved into the stack-supporting position, and so that the distal part is removed from engagement with any of the roofing washers in the stack, through the aperture in the chute, when the distal part is moved into the stack-releasing position.

Desirably, the stack-supporting finger is bent from a spring metal strip so as to have a proximal part mounted fixedly to the chute. Thus, the stack-supporting finger is flexible so that the distal part is movable between the stack-supporting position and the stack-releasing position. Also, the stack-releasing position of the distal part is the normal position of the distal part.

Preferably, if the stack-supporting finger is as described in the preceding paragraph, a finger-moving plate is mounted operatively to the chute. The finger-moving plate is movable between an inoperative position and an operative position so as to flex the stack-supporting finger and to move the distal part of the stack-supporting finger to the stack-supporting position when the finger-moving plate is moved from the inoperative position to the operative position and so as to allow the distal part of the flexible finger to move from the stack-supporting position to the stack-releasing position when the finger-moving plate is moved from the operative position to the inoperative position. The finger-moving plate is biased to the operative position.

Preferably, moreover, the supporting and releasing means includes two such stack-supporting fingers bent from spring metal strips, each on a different side of an imaginary plane comprising an imaginary line extending through the central apertures of the respective washers in the stack. In the preferred embodiment, the supporting and releasing means further includes two finger-moving plates, as described above.

In an alternative arrangement, a stack-supporting finger is mounted pivotably to the chute so that a distal part of the stack-supporting finger is movable between a stack-supporting position and a stack-releasing position, so that the distal part extends beneath and engages the second to lowermost washer in the stack when the distal part is moved into the stack-supporting position, and so that the distal part is removed from engagement with any of the roofing washers in the stack when the distal part is moved into the stack-releasing position.

Preferably, two such stack-supporting fingers are mounted pivotably to the chute, each on a different side of an imaginary plane comprising an imaginary line through the central apertures of the respective washers in the stack.

The improved magazine is useful in a washer-dispensing machine of the type noted above. The washer-dispensing machine may be a washer-dispensing and fastener-driving machine.

Along with the improved magazine, the washer-dispensing machine comprises a base, a shuttle mounted to the base for horizontal movement between a normal position and a displaced position and adapted to engage a single washer from the stack when the shuttle is in the displaced position, to displace the single washer from the stack to a separated position by positive engagement with the single washer as the shuttle is moved from the displaced position to the normal position, and to release the single washer in the separated position as the shuttle next moves from the normal position to the displaced position. Further, the washer-dispensing machine comprises shuttle-moving means adapted to be operator-actuated and to be normally deactuated for moving the shuttle from the displaced position to the normal position when deactuated.

In the washer-dispensing machine, the supporting and releasing means of the improved magazine is operative for supporting the stack when the shuttle-moving means is actuated for moving the shuttle from the normal position to the displaced position. Moreover, the supporting and releasing means is operative for releasing the stack when the shuttle-moving means is operative for moving the shuttle from the displaced position to the normal position.

These and other objects, features, and advantages of this invention are evident from the following description of a preferred embodiment of this invention with reference to the accompanying drawings.

BRIEF DESCRIPTION OF THE DRAWINGS

FIG. 2 is a greatly enlarged, plan view of a roofing washer of a type used in the washer-dispensing and fastener-driving machine, as made from an embossed steel plate and a polymeric insert. The embossed steel plate is shown as having four pairs of downwardly extending barbs.

DETAILED DESCRIPTION OF PREFERRED EMBODIMENT

Figure 1:
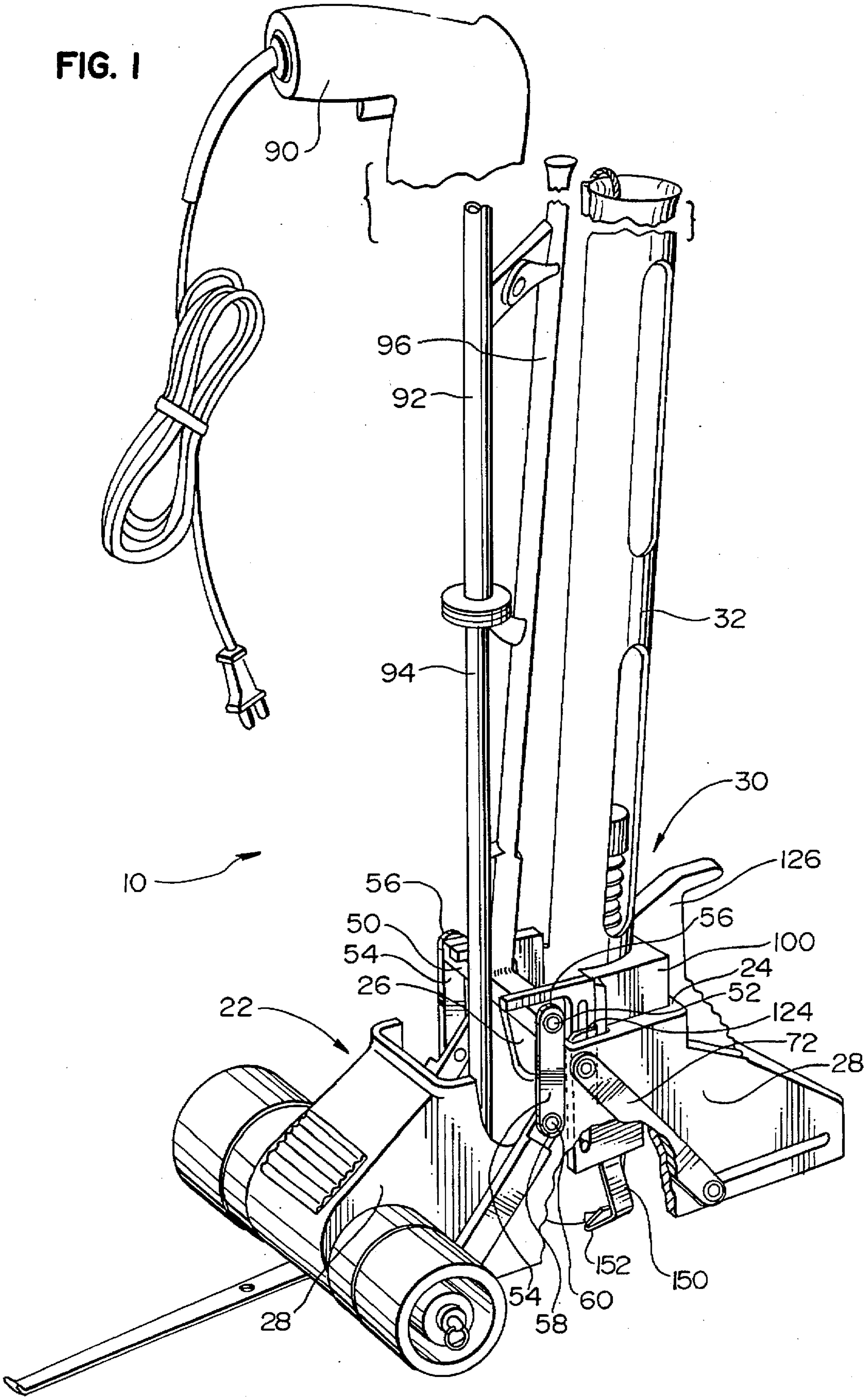
FIG. 1 is a partly fragmentary, perspective view of a washer-dispensing and fastener-driving machine comprising an improved magazine and constituting a preferred embodiment of this invention.

As shown in FIG. 1 and other views, a washer-dispensing and fastener-driving machine 10 constitutes a preferred embodiment of this invention. The machine 10 is used to fasten a sheet of roofing material, such as a blanket of roofing insulation, to an underlayment, such as a wooden roof, by screws of a known type having integral washers with a roofing washer between the head and integral washer of each screw and the sheet of roofing material. Because of this invention, each roofing washer may be a roofing washer 12 of a type shown in FIG. 2 and made from an embossed steel plate 14 having a polymeric insert 16, which defines a central aperture 18 of such roofing washer 12, and having four pairs of barbs 20.

Except as illustrated and described herein, the machine 10 is similar to the washer-dispensing and fastener-driving machines illustrated and described in Beach et al. U.S. Pat. Nos. 4,890,968, No. 5,042,142, and No. 5,056,684, the disclosures of which are incorporated herein by reference.

Broadly, the machine 10 comprises a base 22 having a front plate 24, a back plate 26, and two side plates 28, a magazine 30 which is received by a magazine-receiving chute defined by such plates 24, 26, 28, and a tubular chute 32, which is open at its lower end 34 and at its upper end 36, and which is adapted to contain a stack of the roofing washers 12 with the barbs 20 extending downwardly. The tubular chute 32 has two generally aligned, elongate slots 38, which provide visual access to the stack and which facilitate clearance of any roofing washers 12 that may become jammed. The magazine 30 further comprises a weighted piston 40, which is connected to the upper end 36 of the tubular chute 32 by a tether 42, and which is used to press the stack downwardly in the tubular chute 32.

The machine 10 further comprises a shuttle 44 which is mounted to the base 22 for horizontal movement between a normal position and a displaced position. The shuttle 44 is adapted to engage a single washer 12 from the stack when the shuttle 44 is in the displaced position, to displace the single washer 12 from the stack to a separated position by positive engagement with the single washer 12 as the shuttle 44 is moved from the displaced position to the normal position, and to release the single washer 12 in the separated position as the shuttle 44 next moves from the normal position to the displaced position.

Moreover, the machine 10 comprises shuttle-biasing means, shuttle-moving means, and fastener-driving means, which are similar to similarly named means illustrated and described in Beach et al. U.S. Pat. Nos. 4,890,968 and No. 5,042,142. Thus, the shuttle-biasing, shuttle-moving, and fastener-driving means are provided by linking a stand-up screw gun of a type exemplified in Murray U.S. Pat. No. 3,960,191, Dewey U.S. Pat. No. 4,236,555, and Dewey U.S. Pat. No. 4,397,412 to the shuttle 44, via a mechanical linkage. The disclosures of Murray U.S. Pat. No. 3,960,191, Dewey U.S. Pat. No. 4,236,555, and Dewey U.S. Pat. No. 4,397,412 are incorporated herein by reference.

The shuttle-biasing means biases the shuttle 44 to the normal position but permits the shuttle 44 to be forcibly moved (against such bias) from the normal position to the displaced position. The shuttle-moving means, which is arranged to be operator-actuated and to be normally deactuated, moves the shuttle 44 forcibly (against such bias) from the normal position to the displaced position when actuated and moves the shuttle 44 as biased by the shuttle-biasing means from the displaced position to the normal position when deactuated. The fastener-driving means is used to drive a screw 46 (see FIG. 4) through the central aperture 18 of the single washer 12 while the single washer 12 is in the separated position and the shuttle 44 is in the displaced position.

As disclosed in Beach et al. U.S. Pat. Nos. 4,890,968 and No. 5,042,142, the mechanical linkage noted above is driven by a crosspiece 50 extending laterally on opposite sides and having a pivot pin 52 at each end. A driving link 54 is connected at its upper end 56 to the pivot pin 52 at each end of the crosspiece 50. Each driving link 54 is connected at its lower end 58, via a pivot pin 60, to a rear toggle-link 62 at a location between the ends of the rear toggle link 62. The pivot pin 60 is closer to the upper end 64 of the rear toggle link 62 and further from its lower end 66. Each rear toggle link 62 is connected at its lower end 66, via a pivot pin 68 extending through a suitable aperture in one of the side plates 28 to one end of a brace (not shown) mounted between the side plates. Each rear toggle link 62 is connected at its upper end 64, via a pivot pin 70, to a front toggle link 72 at the upper end 74 of the front toggle link 70. Each front toggle link 72 is connected at its lower end 76, via pivot pin 78, to the respective ends of a brace (not shown) which overlies a front portion of the shuttle 44 and which is assembled to the shuttle 44 by machine screws. Each pivot pin 78 extends through a longitudinal slot 82 in one of the side plates 28.

A screw gun 90, which is mounted on a tubular element 92 telescoped over a tubular element 94, a screw-feeding tube 96, a screw-deflecting slide 98, which is welded to the screw-feeding tube 96 and to which the crosspiece 50 is welded, and various coacting elements are arranged as similarly named elements disclosed in Beach et al. U.S. Pat. Nos. 4,890,968 and No. 5,042,142 are arranged. Thus, when the screw-feeding tube 96, the screw-deflecting slide 98, and the crosspiece 50 are moved downwardly after the screw gun 90 has been pushed downwardly so as to cause a coiled spring (not shown) to be fully compressed, or nearly so, the mechanical linkage comprising the driving links 54, the rear toggle links 62 and the front toggle links 72 causes the shuttle 44 to move toward the displaced position. Also, when the screw-feeding tube 96 and the screw-deflecting slide 98 are moved upwardly, the same linkage causes the shuttle 44 to move toward the normal position. Moreover, a coiled spring (not shown) arranged as a coiled spring disclosed in Beach et al. U.S. Pat. No. 4,890,968 and No. 5,042,142 is arranged biases the tubular element 92 upwardly, so as to bias the shuttle 44 toward the normal position.

Except as described herein, further details of the shuttle-biasing, shuttle-moving, and fastener-driving means are outside the scope of this invention and may be found by reference to Beach et al. U.S. Pat. Nos. 4,890,968 and No. 5,042,142.

Figure 3:
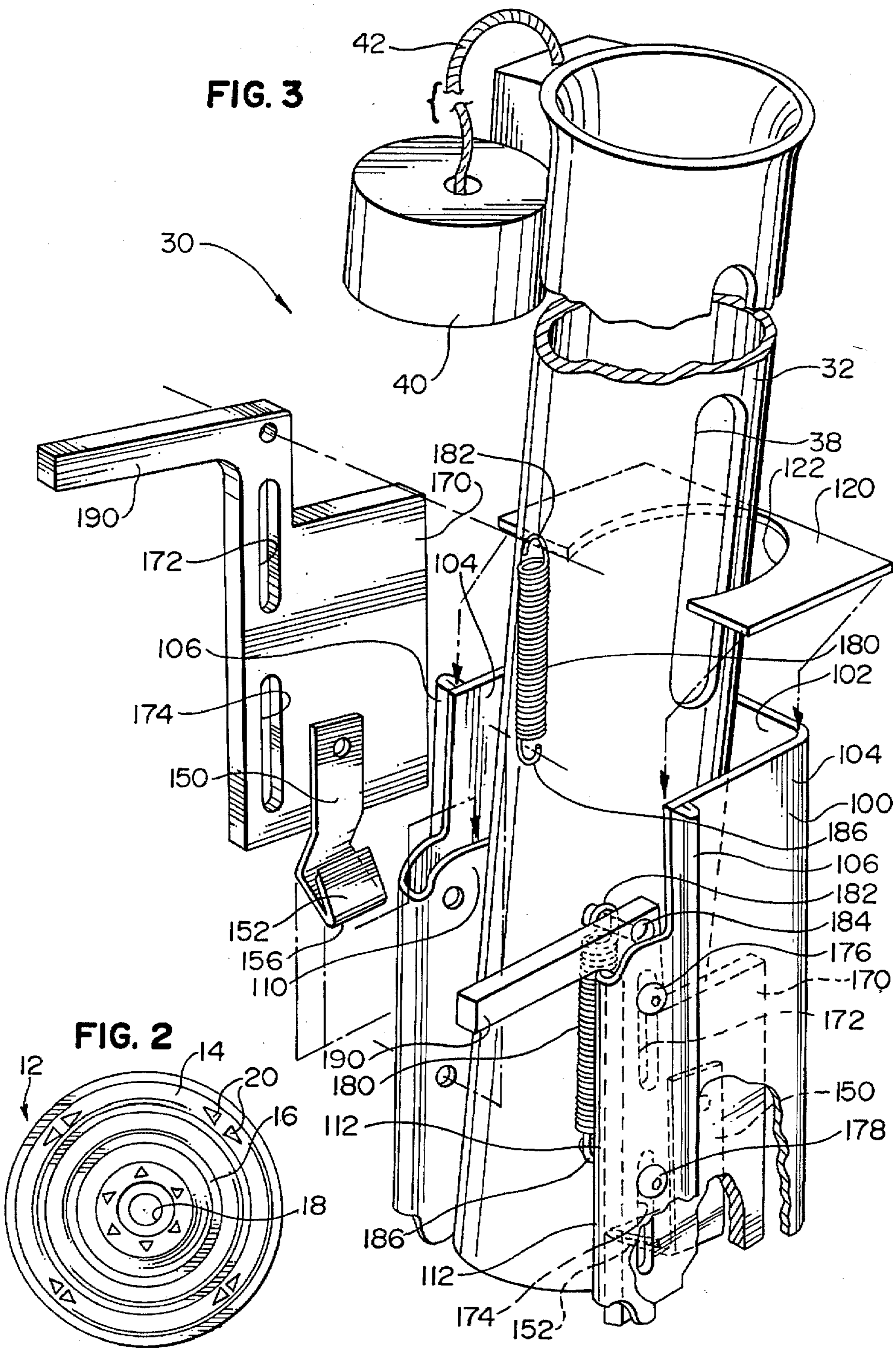
FIG. 3, on a larger scale compared to FIG. 1, is a partly fragmentary, partly exploded, perspective view of the improved magazine and related elements of the washer-dispensing and fastener-driving machine. Some elements have been omitted to simplify the view.

As shown in FIG. 3 and other views, the magazine 30 comprises a box-like support 100, which supports the tubular chute 32 extending upwardly from the support 100 and titled slightly. The support 100 is formed so as to have a front wall 102 and two side walls 104 extending backwardly from the front wall 102, and so as to have a vertical rib 106 extending along each side wall 104. Each side wall 104, as shown in FIG. 3, has welded to it a frontwardly extending flange 110 spaced inwardly from such side wall 104, parallel to such side wall 104, and joined to such side wall 104 by a wide edge 112. Also, the support 100 has a cover 120, which has a generally U-shaped cutout 122. The support 100 is received by the magazine-receiving chute defined by the several plates 24, 26, 28, of the base 22. Near the front plate 24, the side plates 28 are stepped so as to define recesses 124 (see FIG. 1) which accommodate the ribs 106.

Figure 4:
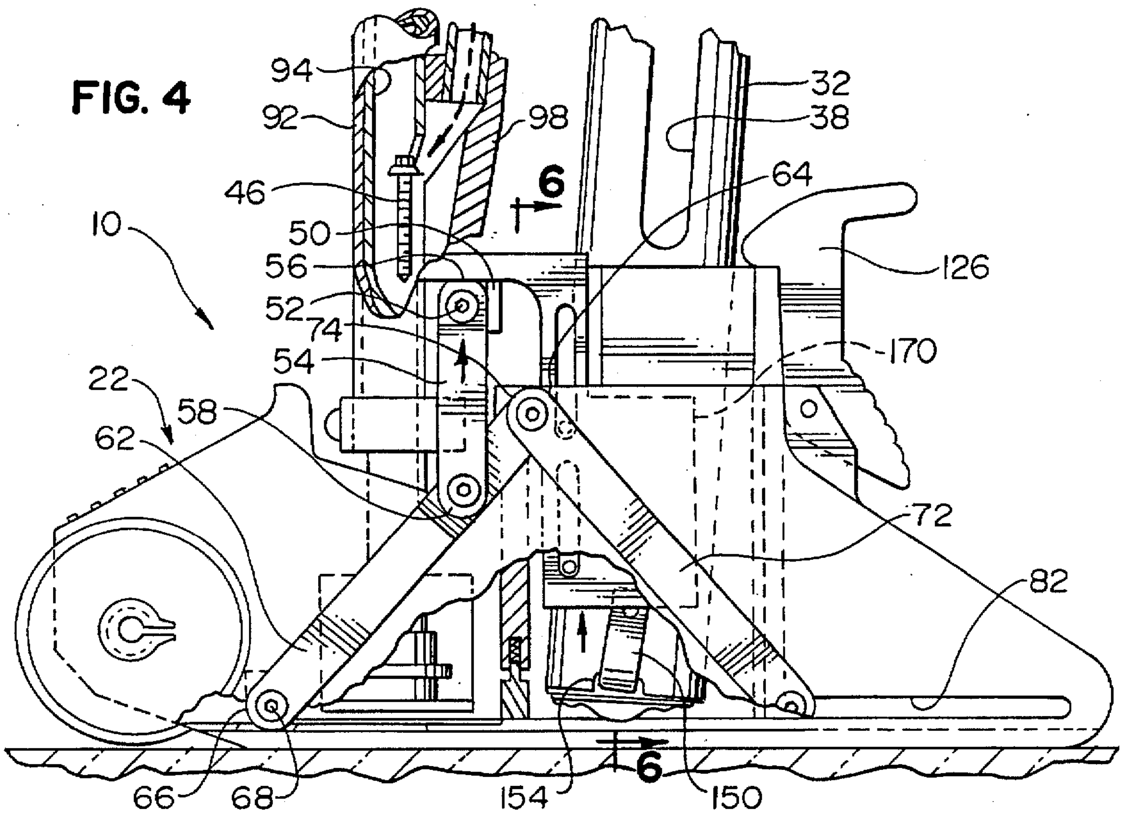
FIG. 4, on a larger scale compared to FIG. 1 but a smaller scale compared to FIG. 3, is an enlarged, sectional view of lower portions of the washer-dispensing and fastener-driving machine.
Figure 5:
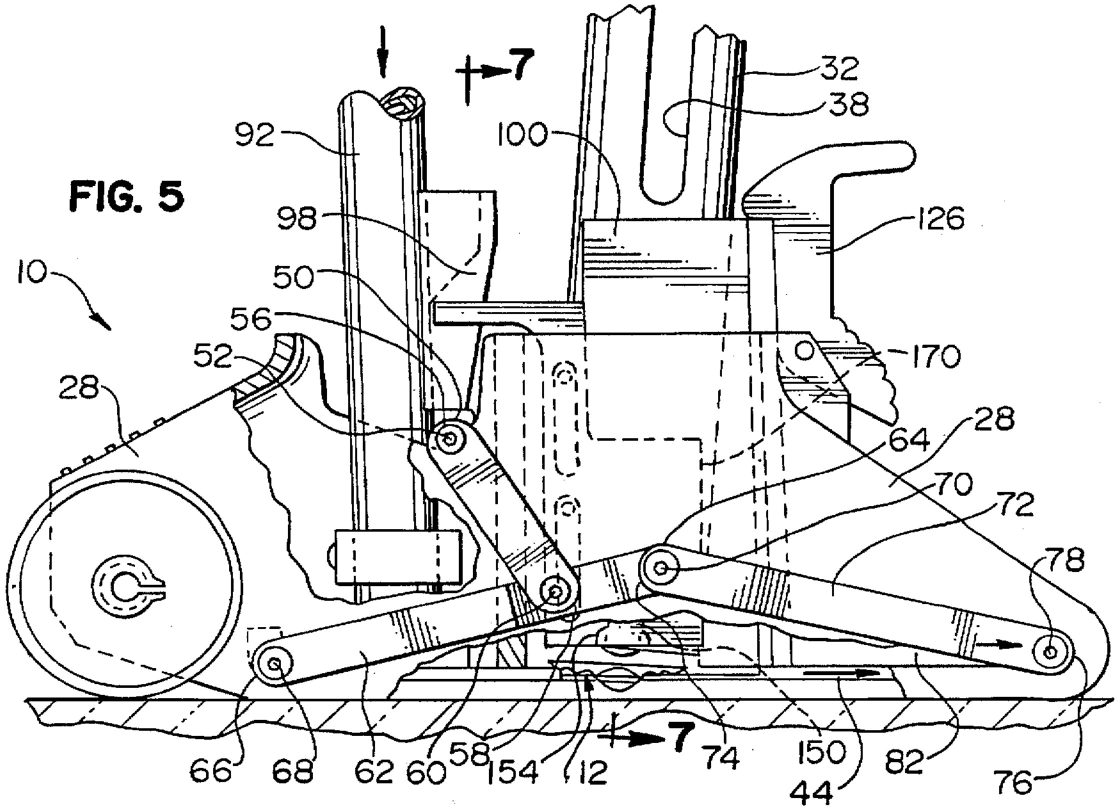
FIG. 5 is a sectional view similar to FIG. 4 but showing certain elements of the washer-dispensing and fastener-driving machine in changed positions.

A magazine latch 126 is mounted pivotally to the base 22 and is pivotable between an operative position, in which the magazine latch 126 is shown in FIGS. 4 and 5 and to which the magazine latch 126 is biased, and an inoperative position. In the operative position, the magazine latch 126 engages the front wall at an upper edge 128, so as to latch the magazine 30 releasably to the base 22. In the inoperative position, the magazine latch 126 is pivoted away from the upper edge 128, so as to allow the magazine 30 to be then lifted from the base 22.

Figure 7:
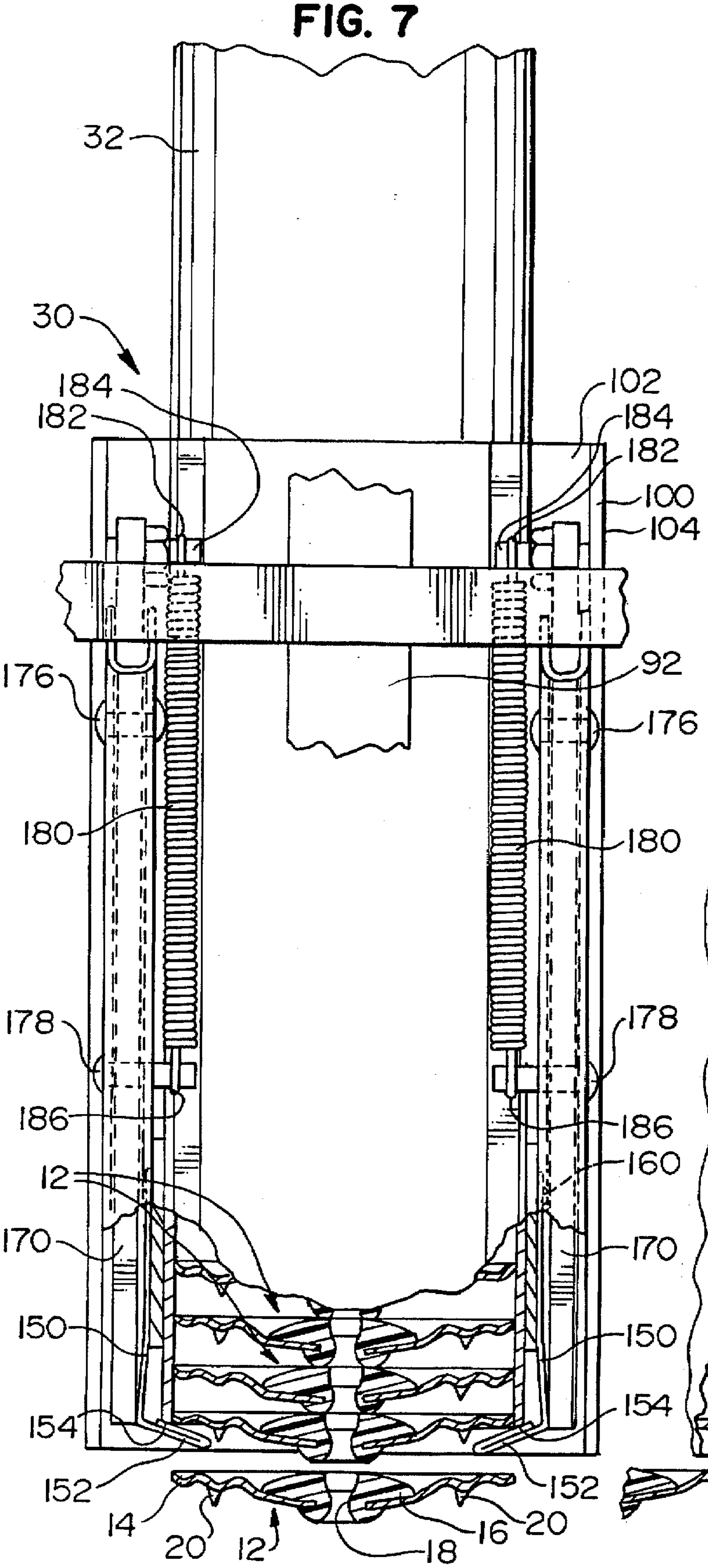
FIG. 7 is a similarly enlarged, sectional view taken along line 7—7 of FIG. 5, in a direction indicated by arrows.
Figure 6:
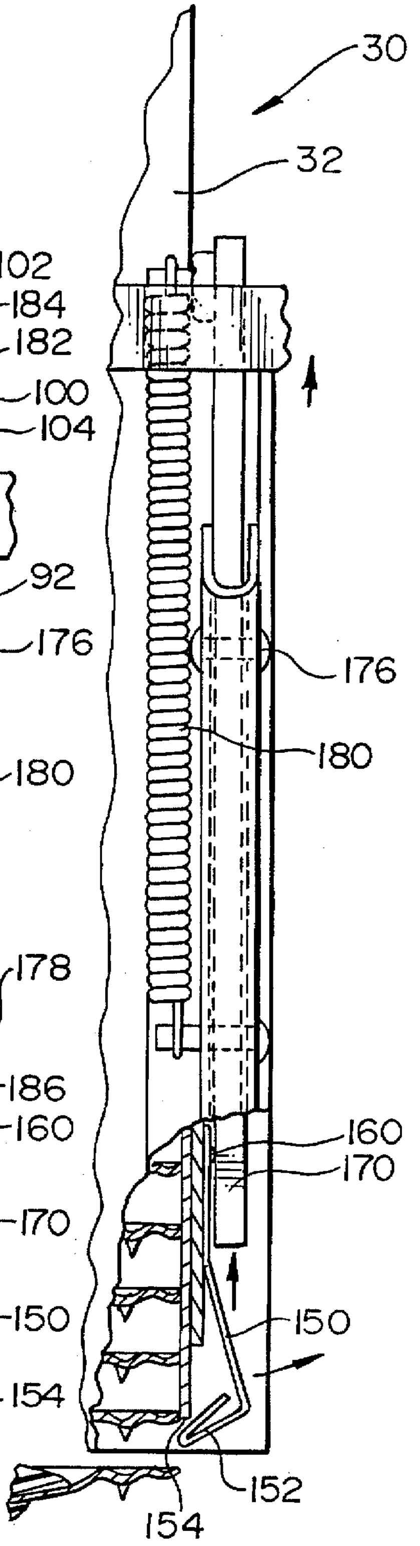
FIG. 6 is a further enlarged, sectional view taken along line 6—6 of FIG. 4, in a direction indicated by arrows.

As shown in FIGS. 3, 6, and 7, the magazine 30 further includes two supporting fingers 150. The supporting fingers 150 are mounted operatively to the tubular chute 32, each on a different side of an imaginary plane comprising an imaginary line extending through the central apertures 18 of the roofing washers 12 in a stack contained by the tubular chute 32, so that a distal part 152 of each supporting finger 150 is movable between a stack-supporting position and a stack-releasing position.

As shown in FIG. 7, the distal part 152 of each supporting finger 150 extends beneath and engages the second to lowermost washer 12 in a stack contained by the tubular chute 32, through an associated aperture 154 in the tubular chute 32, so as to support the stack when the distal part 152 of such supporting finger 150 is moved into the stack-supporting position. As shown in FIG. 6, the distal part 152 of each supporting finger 150 is removed from engagement with any of the roofing washers 12 in a stack contained by the tubular chute 32, through the associated aperture 154, when the distal part 152 of such supporting finger 150 is moved to the stack-releasing position. The respective apertures 154 are located at a lower edge of the tubular chute 32.

Therefore, when the distal parts 152 of both stack-supporting fingers 150 extend beneath and engage the second to lowermost washer 12 in a stack contained by the tubular chute 32, the roofing washers 12 in the stack are supported so that the second to lowermost washer 12 in the stack cannot catch on the shuttle 44 as the shuttle 44 is moved.

However, when the distal parts 152 of both stack-supporting fingers 150 are removed from engagement with any of the roofing washers 12 in a stack contained by the tubular chute 32, the roofing washers 12 in the stack are permitted to drop. Thus, the lowermost washer 12 in the stack drops through the lower end 34 of the tubular chute 32, onto the shuttle 44.

As shown in FIG. 6, each stack-supporting finger 150 is bent from a spring metal strip so as to have a doubled-over edge on the distal part of such stack-supporting finger 150. Moreover, each stack-supporting finger 150 has a proximal part 158, which is fastened by a rivet 160 (see FIG. 6 and 7) to the tubular chute 32. Because a spring metal strip is bent to form each stack-supporting finger 150, the distal part 152 is movable between the stack-supporting and stack-releasing positions by flexure of such stack-supporting finger 150.

As shown in FIGS. 3, 6, and 7, the magazine 30 further includes two finger-moving plates 170, each of which is associated with one of the stack-supporting fingers 150. Each finger-moving plate 170 is mounted in movable relation to the support 100 and to the tubular chute 32. Each finger-moving plate 170 is mounted between an associated one of the flanges 110 and the nearer one of the side walls 104, so as to be vertically movable between an upper, inoperative position and a lower, operative position.

Each finger-moving plate 170 has an upper, vertically extending slot 172 and a lower, vertically extending slot 174, which is aligned generally with the upper slot 172. Two pins having enlarged heads at their opposite ends are employed to mount each finger-moving plate 170. An upper pin 176 extends through an aperture (not shown) in the associated one of the flanges 100, through the upper slot 172 of each finger-moving plate 170, and through an aligned aperture (not shown) in the nearer one of the side walls 104. A lower pin 178 extends through an aperture (not shown) in the associated one of the flanges 100, through the lower slot 174 of each finger-moving plate 170, and through an aligned aperture (not shown) in the nearer one of the side walls 104.

Each finger-moving plate 170 is biased downwardly to the inoperative position. A coiled tension spring 180 is attached at an upper end 182 to each finger-moving plate 170, via a separate pin 184 above the upper pin 176 mounting such finger-moving plate 170, and at a lower end 186 to the lower pin 178 mounting such finger-moving plate 170. Each finger-moving plate 170 has an upper prong 190 extending backwardly so as to overlie the crosspiece 50 where the crosspiece 50 extends laterally on one side.

Therefore, each finger-moving plate 170 is arranged to be downwardly moved by the coiled tension spring 180 biasing such finger-moving plate 170 and to flex the distal part 152 of the stack-supporting finger 150 associated with the such finger-moving plate 170 so that the distal part 152 thereof is moved to the stack-supporting position, when the crosspiece 50 is moved downwardly as the shuttle 44 is moved to the displaced position. Thus, the roofing washers 12 in a stack contained by the tubular chute 32 are supported at a sufficient distance above the shuttle 44 so that the lowermost washer 12 in the stack does not catch on the shuttle 44, when the shuttle 44 is not in the normal position.

Moreover, each finger-moving plate 170 is arranged to be upwardly moved by the crosspiece 50 engaging the upper prong 190 of such finger-moving plate 170 and pulling against the coiled tension spring 180 biasing such finger-moving plate 170 upwardly so that the distal part 152 of the stack-supporting finger 150 associated with such finger-moving plate 170 is permitted to return to the stack-releasing position, when the crosspiece 50 is moved upwardly as the shuttle 44 is moved to the normal position. Thus, the lowermost washer 12 in a stack contained by the tubular chute 32 is permitted to drop onto the shuttle 44, when the shuttle 44 is in the normal position.

In an alternative embodiment shown in FIGS. 8 through 11, in which elements similar to elements shown in FIGS. 1 through 7 and described above are numbered similarly, the magazine 30 includes two supporting fingers 200, which differ from the supporting fingers 150 in some respects. The supporting fingers 200 are mounted pivotably to the tubular chute 32 so as to extend downwardly, each on a bolt 202 mounted to the box-like support 100 and each on a different side of an imaginary plane comprising an imaginary line through the central apertures 18 of the respective washers in a stack contained by the tubular chute 32, so that a distal part 212 of each supporting finger 200 is movable between a stack-supporting position and a stack-releasing position.

Figure 8:
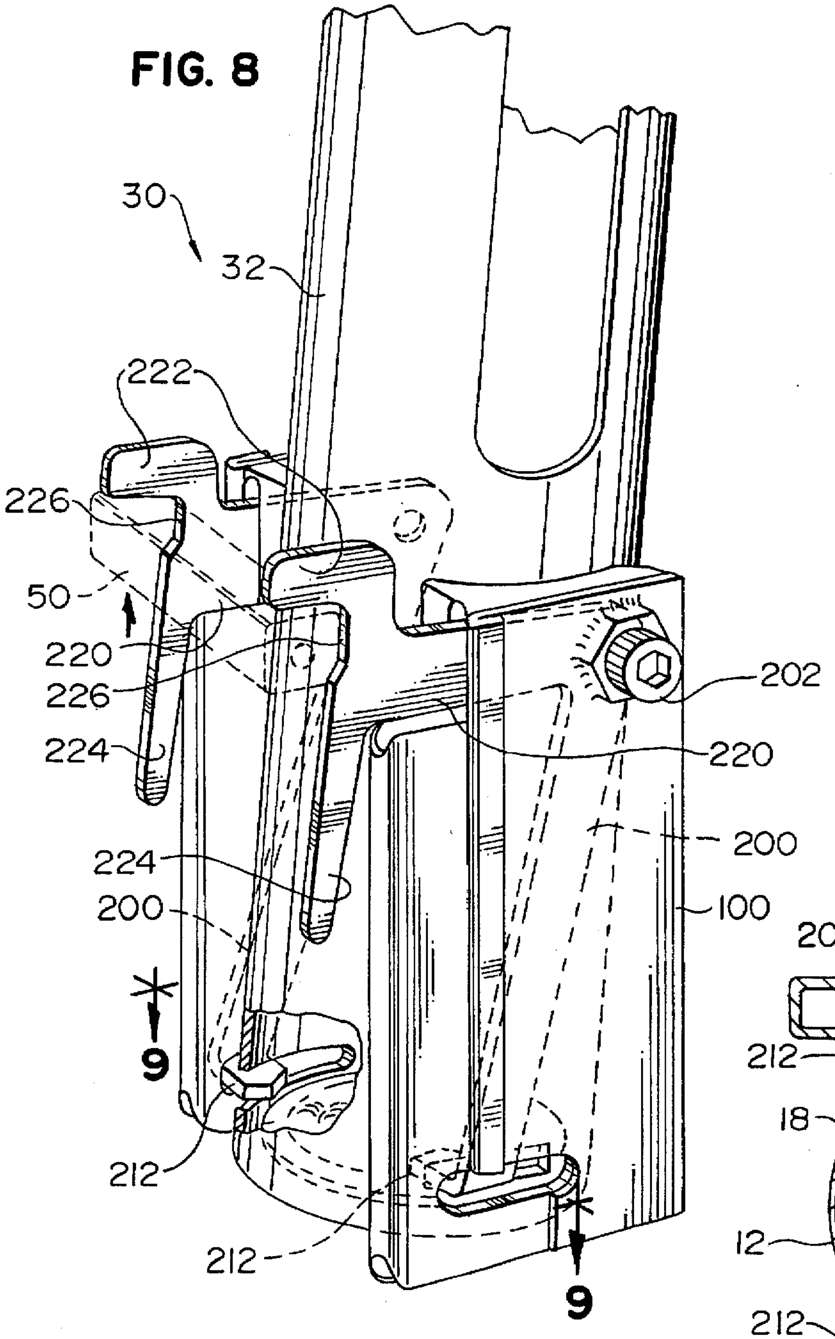
FIG. 8 is a partly fragmentary, perspective view of an improved magazine and related elements of a washer-dispensing and fastener-driving machine constituting an alternative embodiment of this invention.
Figure 9:
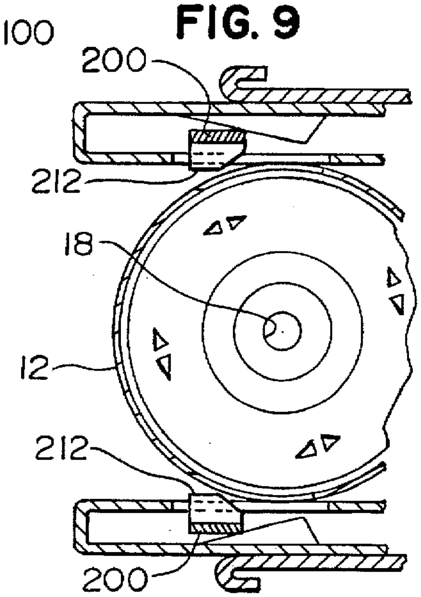
FIG. 9 is a sectional view taken along line 9—9 of FIG. 8, in a direction indicated by arrows.
Figure 10:
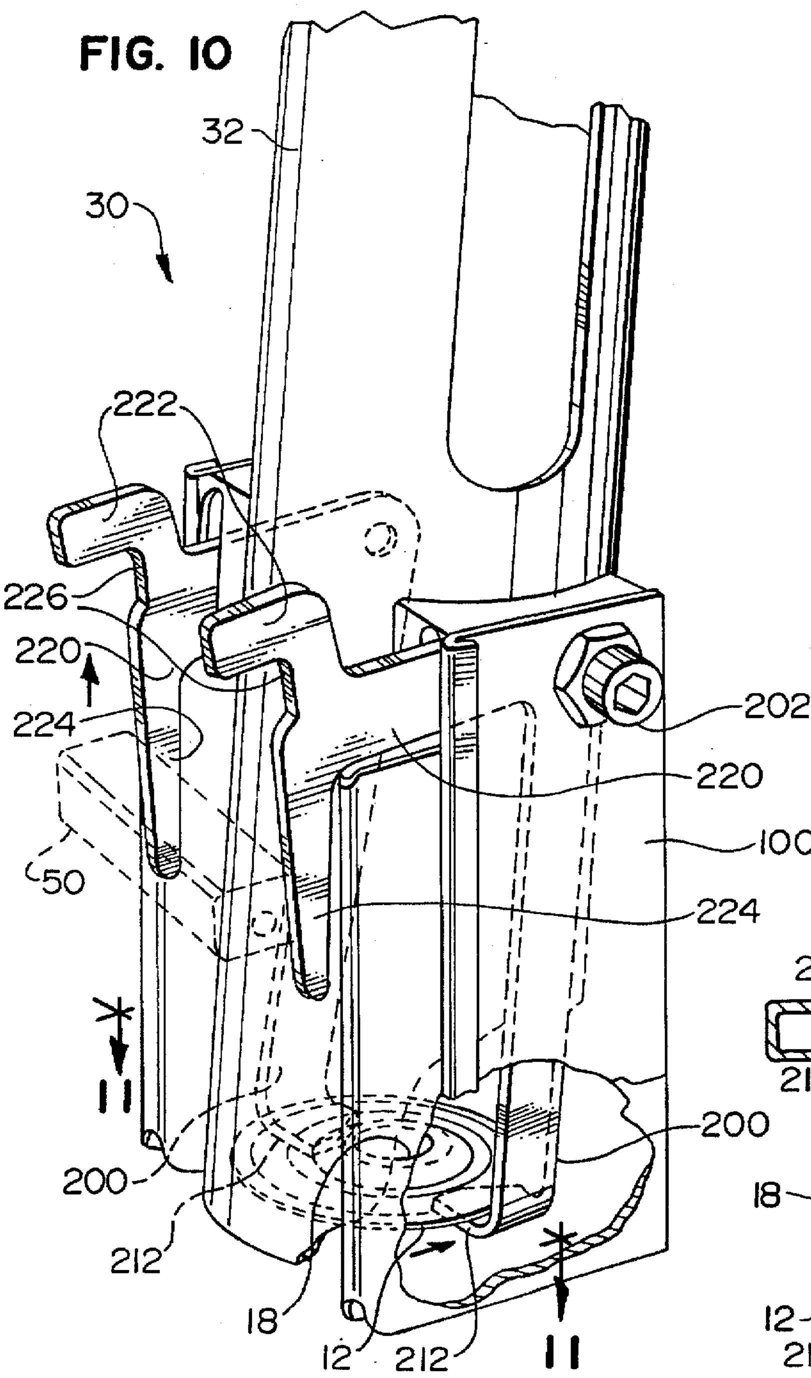
FIG. 10 is a view similar to FIG. 8 but showing certain elements in changed positions.
Figure 11:
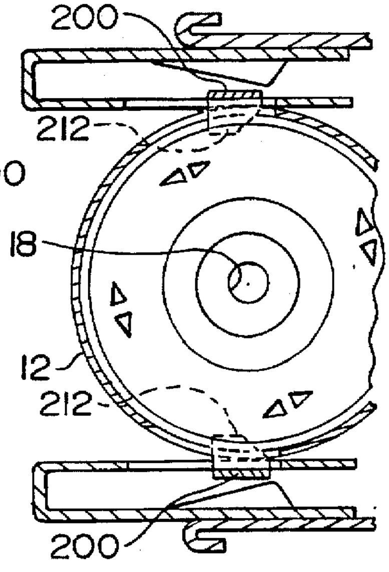
FIG. 11 is a sectional view taken along line 11—11 of FIG. 10, in a direction indicated by arrows.

In FIGS. 8 and 9, the supporting fingers 200 are shown in their stack-supporting positions, in which the distal parts 212 entend beneath and engage the lowermost washer 12 in a stack contained in the tubular chute 32. In FIGS. 10 and 11, the supporting fingers 200 are shown in their stack-releasing positions, in which the distal parts 212 are removed from engagement with any of the roofing washers 12 in the stack.

As shown, each supporting finger 200 has an upper, horizontal extension 220 with a hooked end 222, with an elongate prong 224 extending downwardly from the hooked end 222, and with a notch 226 where the elongate prong 224 meets the hooked end 222. As shown in broken lines in FIGS. 8 and 10, the crosspiece 50 described above is arranged to enter the notches 226 and to lift the hooked ends 222 when the crosspiece 50 is moved upwardly, so as to pivot the supporting fingers 200 from their stack-supporting positions into their stack-releasing positions. Moreover, the crosspiece 50 is arranged to leave the notches 226 and to move along the elongate prongs 224 with a camming action when the crosspiece 50 is moved downwardly, so as to pivot the supporting fingers 200 from their stack-releasing position into their stack-supporting positions.

Except as illustrated in the drawings and described above, the preferred and alternative embodiments of this invention are similar and function similarly.

Various modifications may be made in the preferred and alternative embodiments described above without departing from the scope and spirit of this invention.

We claim:

1. A magazine for a stack of roofing washers of a type having a central aperture to receive a fastener shank and having downwardly extending barbs, the magazine comprising a chute adapted to contain the stack of roofing washers having downwardly extending barbs, the chute having a lower end, which is open, and means mounted operatively to the chute and operative selectively for supporting the stack so as to prevent any of the washers in the stack from dropping through the lower end of the chute and for releasing the stack so as to permit a lowermost washer in the stack to drop through the lower end of the chute wherein said means includes a stack-supporting finger mounted operatively to the chute so that a distal part of the stack-supporting finger is movable between a stack-supporting position and a stack-releasing position, so that the distal part extends beneath and engages the second to lowermost washer in the stack, through an aperture in the chute, when the distal part is moved into the stack-supporting position, and so that the distal part is removed from engagement with any of the roofing washers in the stack,through the aperture in the chute, when the distal part is moved into the stack-releasing position, wherein the stack-supporting finger is bent from a spring metal strip so as to have a proximal part mounted fixedly to the chute, wherein the stack-supporting finger is flexible so that the distal part is movable between the stack-supporting position and the stack-releasing position, and wherein the stack-releasing position of the distal part is the normal position of the distal part.

2. The magazine of claim 1 wherein the said means further includes a finger-moving plate mounted operatively to the chute, the finger-moving plate being movable between an inoperative position and an operative position so as to flex the stack-supporting finger and to move the distal part of the stack-supporting finger to the stack-supporting position when the finger-moving plate is moved from the inoperative position to the operative position and so as to allow the distal part of the flexible finger to move from the stack-supporting position to the stack-releasing position when the finger-moving plate is moved from the operative position to the inoperative position, the finger-moving plate being biased to the operative position.

3. The magazine of claim 1 wherein said means includes two such stack-supporting fingers mounted operatively to the chute, each on a different side of an imaginary plane comprising an imaginary line extending through the central apertures of the respective washers in the stack, so that distal parts of each stack-supporting finger are movable between stack-supporting positions and stack-releasing positions, wherein the distal parts of the stack-supporting fingers extend beneath and engage the second to lowermost washer in the stack, each through an associated aperture in the chute, when the distal parts of the stack-supporting fingers are moved into the stack-supporting positions, and wherein the distal parts of the stack-supporting fingers are removed from engagement with any of the roofing washers in the stack, each through the associated aperture in the chute, when the distal parts of the stack-supporting fingers are moved into the stack-releasing positions.

4. The magazine of claim 3 wherein the supporting means further includes two finger-moving pages mounted operatively to the chute, each finger-moving plate being associated with one of the stack-supporting fingers and each finger-moving plate being movable between an inoperative position and an operative position so as to flex the associated finger and to move the distal part of the associated finger to the stack-supporting position when said finger-moving plate is moved from the inoperative position to the operative position and so as to allow the distal part of the associated finger to move from the stack-supporting position to the stack-releasing position when said finger-moving plate is moved from the operative position to the inoperative position, each finger-moving plate being biased to the operative position.

5. In a washer-dispensing machine comprising a base, a magazine for a stack of roofing washers, and a shuttle, each washer being of a type having a central aperture to receive a fastener shank and having downwardly extending barbs, the magazine including a chute supported by the base and adapted to contain the stack of roofing washers having downwardly extending barbs, the chute having a lower end, which is open, the shuttle being mounted to the base for horizontal movement between a normal position and a displaced position and adapted to engage a single washer from the stack when the shuttle is in the displaced position, to displace the single washer from the stack to a separated position by positive engagement with the single washer as the shuttle is moved from the displaced position to the normal position, and to release the single washer in the separated position as the shuttle next moves from the normal position to the displaced position, and means arranged to be normally deactuated and adapted to be operator-actuated for moving the shuttle from the normal position to the displaced position when actuated and for moving the shuttle from the displaced position to the displaced position when actuated and for moving the shuttle from the displaced position to the normal position when deactuated, an improvement wherein the machine further comprises means mounted operatively to the chute for supporting the stack so as to prevent any of the washers in the stack from dropping through the lower end of the chute and for releasing the stack so as to permit a lowermost washer in the stack to drop through the lower end of the chute, the supporting and releasing means being operative for supporting the stack when the shuttle-moving means is actuated for moving the shuttle from the normal position to the displaced position and being operative for releasing the stack when the shuttle-moving means is actuated for moving the shuttle from the displaced position to the normal position, wherein the supporting and releasing means includes a stack-position, and wherein the distal part is removed from engagement with any of the roofing washers in the stack, through the aperture in the chute, when the distal part is moved into the stack-releasing position, wherein the stack-supporting finger is bent from a spring metal strip so as to have a proximal part mounted fixedly to the chute, wherein the stack-supporting finger is flexible so that the distal part is movable between the stack-supporting position and the stack-releasing position, and wherein the stack-releasing position of the distal part is the normal position of the distal part.

6. The improvement of claim 5 wherein the supporting and releasing means further includes a finger-moving plate mounted operatively to the chute, the finger-moving plate being movable between an inoperative position and an operative position so as to flex the stack-supporting finger and to move the distal part of the stack-supporting finger to the stack-supporting position when the finger-moving plate is moved from the inoperative position to the operative position and so as to allow the distal part of the flexible finger to move from the stack-supporting position to the stack-releasing position when the finger-moving plate is moved from the operative position to the inoperative position, the finger-moving plate being biased to the operative position, the finger-actuating plate coacting with the shuttle-moving means so as to move to the inoperative position when the shuttle is moved to the normal position and so as to move to the operative position when the shuttle is moved to the displaced position.

7. The improvement of claim 6 wherein the supporting and releasing means includes two such stack-supporting fingers mounted operatively to the chute, each on a different side of an imaginary plane comprising an imaginary line extending through the central apertures of the respective washers in the stack, so that distal parts of the stack-supporting finger are movable between stack-supporting positions and stack-releasing positions, wherein the distal parts of the stack-supporting fingers extend beneath and engage the second to lowermost washer in the stack, each through an associated aperture in the chute, when the distal parts of the stack-supporting fingers are moved into the stack-supporting positions, and wherein the distal parts of the stack-supporting fingers are removed from engagement with any of the roofing washers in the stack, each through the associated aperture in the chute, when the distal parts of the stack-supporting fingers are moved into the stack-releasing positions.

8. The improvement of claim 5 wherein the supporting and releasing means further includes two finger-moving plates mounted operatively to the chute, each finger-moving plate being associated with one of the stack-supporting fingers and finger-moving plate being movable between an inoperative position and an operative position so as to flex the associated finger and to move the distal part of the associated finger to the stack-supporting position when said finger-moving plate is moved from the inoperative position to the operative position and so as to allow the distal part of the associated finger to move from the stack-supporting position to the stack-releasing position when said finger-moving plate is moved from the operative position to the inoperative position, each finger-moving plate being biased to the operative position, each finger-moving plate coacting with the shuttle-moving means so was to move to the inoperative position when the shuttle is moved to the normal position and so as to move to the operative position when the shuttle is moved to the displaced position.

9. In a washer-dispensing machine comprising a base, a magazine for a stack of roofing washers, and a shuttle, each washer being of a type having a central aperture to receive a fastener shank and having downwardly extending barbs, the magazine including a chute supported by the base and adapted to contain the stack of roofing washers having downwardly extending barbs, the chute having a lower end, which is open, the shuttle being mounted to the base for horizontal movement between a normal position and a displaced position and adapted to engage a single washer from the stack when the shuttle is in the displaced position, to displace the single washer from the stack to a separated position by positive engagement with the single washer as the shuttle is moved from the displaced position to the normal position, and to release the single washer in the separated position as the shuttle next moves from the normal position to the displaced position, and means arranged to be normally deactuated and adapted to be operator-actuated for moving the shuttle from the normal position to the displaced position when actuated and for moving the shuttle from the displaced position to the normal position when deactuated, an improvement wherein the machine further comprises means mounted operatively to the chute for supporting the stack so as to prevent any of the washers in the stack from dropping through the lower end of the chute and for releasing the stack so as to permit a lowermost washer in the stack to drop through the lower end of the chute, the supporting and releasing means being operative for supporting the stack when the shuttle-moving means is actuated for moving the shuttle from the normal position to the displaced position and being operative for releasing the stack when the shuttle-moving means is actuated for moving the position, wherein the supporting and releasing means includes a stack-supporting finger mounted pivotably to the chute so that a distal part of the stack-supporting finger is movable between a stack-supporting position and a stack-releasing position, so that the distal part extends beneath and engages the second to lowermost washer in the stack when the distal part is removed into the stack-supporting position, and so that the distal part is removed from engagement with any of the roofing washers in the stack when the distal part is moved into the stack-releasing position, wherein the shuttle-moving means coacts with the stack-supporting finger so as to cause the stack-supporting finger to pivot to the stack-releasing position when the shuttle is moved to the normal position and so as to cause the stack-supporting finger to pivot to the stack-supporting position when the shuttle is moved to the displaced position.

* * * * *